Feb. 11, 1941.  R. S. PILGER  2,231,480
METHOD OF ELECTRICALLY WELDING STUDS
Filed April 20, 1939

Inventor
R. S. Pilger
By
Young Young
Attorneys

Patented Feb. 11, 1941

2,231,480

UNITED STATES PATENT OFFICE 2,231,480

METHOD OF ELECTRICALLY WELDING STUDS

Roy S. Pilger, Manitowoc, Wis., assignor to Aluminum Goods Manufacturing Company, Manitowoc, Wis.

Application April 20, 1939, Serial No. 268,946

5 Claims. (Cl. 219—10)

This invention pertains to the novel method of welding studs to various objects.

While the invention is applicable to many uses, and may be employed in all instances where it is desired to provide an element with an exceedingly strong and rigid projection, without perforating, drilling, tapping, or in any way disturbing or mutilating the element, for the purpose of explanation only, the invention has been illustrated, and will be described in connection with rivets applied to cooking receptacles or the like for attaching handles.

The invention has primarily for its object the provision of a stud provided with a flattened head attached to a metallic surface by a weld of substantially the same area as the cross sectional area of the shank.

Incidental to the foregoing, a more specific object of the present invention resides in the provision of an aluminum stud welded to an aluminum surface, and forming a rivet for attachment of any desired element.

A further object resides in the novel method of attaching a stud consisting in, first applying pressure for deforming the head of the stud while in contact with the surface to which it is to be welded, by means of an adaptor forming one of the welding points, and then applying additional pressure simultaneously with a welding current to further deform the head of the stud, and increase the area of electrical contact between the adaptor and stud for reducing the welding temperature, whereby excessive gas pressure, with resultant explosion and blowing of the material is prevented.

With the above and other objects in view, which will appear as the description proceeds, the invention resides in the novel method, construction, combination, and arrangement of parts, substantially as hereinafter described, and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

Figure 1:
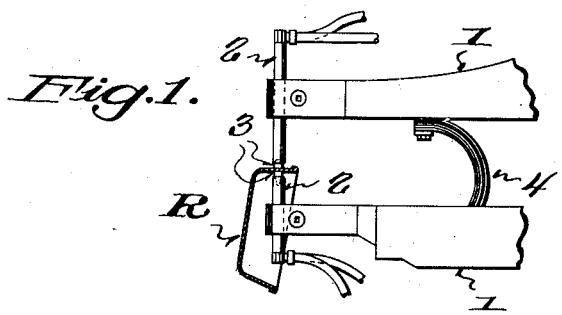
Figure 1 is a fragmentary view of a conventional spot welding machine employed in carrying out the principles of the present invention.

Referring now more particularly to the accompanying drawing, in Figure 1 the arms of the conventional electric spot welder, indicated by the numeral 1, are provided with the usual electrodes 2, which carry the welding points 3. Inasmuch as the arms 1 are relatively movable, the usual heavy laminated conductor 4 provides a connection between the arm, which will withstand repeated flexing without impairing its physical or electrical properties. Figure 1 further illustrates the operation of welding a stud upon a receptacle R.

Figure 2:
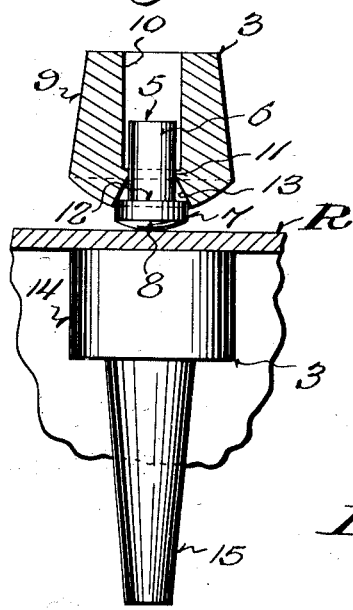
Figures 2 to 4 are enlarged fragmentary sections illustrating different steps in the novel method practiced in attaching the studs.

Figure 2 illustrates the initial form of a stud prior to the attaching operation. As will be noted, the stud 5 consists of a rounded shank 6 provided with a head 7, the outer face 8 being crowned or semi-spherical in shape. The upper point 3 comprises an adaptor 9, provided with an outer tapered wall for a wedge fit in the upper electrode 2. The upper portion of the adaptor 9 is provided with a cylindrical bore 10 terminating in a restricted opening 11 adapted to snugly engage the shank 6 of the stud, while the sharp inner edge 12 of the head 7 is engaged in a tapered recess 13 formed in the bottom of the adaptor, which is crowned, or convex in contour, to provide minimum contact with the surface to which the stud is subsequently welded.

Cooperating with the adaptor 9 in the welding operation, the lower point 3 comprises a tip having a head 14, and a tapered shank 15 for insertion in the lower electrode 2 to provide a wedge fit. In practice, a stud is inserted into the adaptor as shown in Figure 2, and an article to which the stud is to be welded is placed over the tip.

Figure 3:
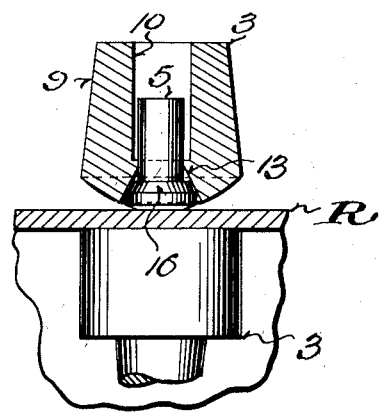

Pressure is then applied to the upper arm 1 of the welder to force the adaptor 9 downwardly on the stud 5 for a predetermined distance as illustrated in Figure 3. During this operation it will be noted that the crowned face 8 of the head of the stud is slightly flattened upon the receptacle R so that the area of contact between the stud and that of the receptacle is substantially the same as the cross sectional area of the shank 6. At the same time the face of the head 7 is flattened upon the receptacle, the inner edge 12 of the head is deformed by the recess 13 to provide an annular tapered surface 16, in intimate contact with the adaptor.

Here it may be explained that the initial deforming of the head of the stud under pressure, in the absence of welding current and heat, rather than resorting to a stud preformed to the shape shown in Figure 3 of the drawing, constitutes an important feature of the invention, in that it not only provides a more intimate contact between the stud and both the adaptor and receptacle, but also results in a self-cleaning or freeing operation. That is, the scraping action resulting from compression and subsequent deforming of the head of the stud, removes any trace of oxide or other foreign matter from the surface of the welding point, which might have been left from a previous weld. This naturally results in a greatly prolonged life of the welding point, and prevents sticking.

Following the foregoing operation, additional pressure is applied to the points, simultaneously with the welding current, and due to the limited contact between the stud and adaptor, afforded by the tapered surface 16, maximum heat is generated for initiating the welding operation. Inasmuch as the current passing through the head of the stud will follow the path of least resistance, and the area of the tapered surface 16 is substantially that of the flattened surface of the head 7, the weld occurs throughout substantially the entire area of engagement between the stud and receptacle, which as heretofore explained, is approximately the same area as the cross sectional area of the shank.

Figure 4:
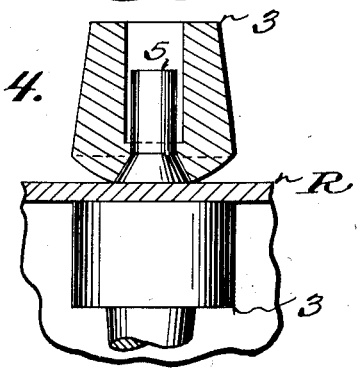

During the welding operation, the head of the stud is heated sufficiently to cause the metal to flow and fill the tapered recesses of the adaptor 9, as shown in Figure 4. As the metal flows, the area of contact between the stud and adaptor is increased, which obviously reduces resistance to the welding current, and, consequently, the temperature generated. This is important, inasmuch as reduction of temperature prior to completion of the weld prevents the generation of excessive pressure between the stud and receptacle, thus eliminating explosion and blowing of metal, which usually occurs where high temperatures are maintained.

Although upon completion of the weld, it has been established that the same occurs only over an area of substantially the same as the cross sectional area of the shank, while the final diameter of the head of the stud is necessarily greater, this affords an advantage in that it adds support for the stud against forces exerted transversely against the same.

Figure 5:
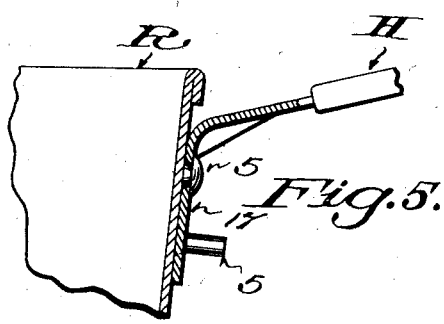
Figure 5 is a fragmentary section illustrating the manner in which a handle is attached to a receptacle by means of the studs or rivets welded to the receptacle.

As shown in Figure 5, the handle H includes a foot 17 provided with counter-sunk openings, for reception of the tapered heads of the studs 5 welded to the receptacle R, after which they are upset to securely lock the handle to the receptacle.

From the foregoing explanation considered in connection with the accompanying drawing, it will be seen that an exceedingly efficient welded stud has been provided, the attachment of which precludes any possibility of loosening of the studs under stresses far in excess of those encountered in ordinary use, and as a matter of fact, actual tests have shown the weld to be so secure that in attempting to forcibly remove a stud, the material of which the utensil or article is formed, for instance, heavy gage aluminum plate, is broken or mutilated, as the weld will not release itself.

Lastly, the present invention is particularly applicable to attachment of articles of unlike metals. For instance, heretofore it has been impossible to attach steel handles to aluminum utensils by spot welding, consequently, the receptacles had to be punched or mutilated for reception of conventional rivets, which is objectionable. This is entirely overcome by the present spot welded rivet.

It is well known in the industry that studs have been welded to various objects, but as far as is known, the same have always been preformed with enlarged heads, which are spot welded at spaced points adjacent the periphery of the head, beyond the shank area. However, such studs are easily broken loose under slight stresses, and in the majority of cases, such studs must be formed of steel, inasmuch as an aluminum head in such manner, because of its ductile characteristics, would have to be excessive in diameter to provide a sufficient weld for ordinary purposes.

It is also known that handles have been attached to receptacles by spot welding the feet directly upon the receptacle. However, this is objectionable in that an exceptionally heavy gage metal is required for the handle foot, and furthermore, the spot welding operation mars the exposed surfaces of the receptacle and handle foot. Also in this type of attachment frequently explosion and blowing of the metal occurs resulting in considerable waste.

The present invention overcomes all of the foregoing objections, and while its principles may be applied to the welding of studs of various types of material, due to the softness and ductility of aluminum, its greatest advantages are found in its application to the same.

I claim:

1. The method of electrically welding a headed stud to a metallic object consisting in, first applying pressure by means of a welding point to the head of said stud in the absence of welding current to partially deform the same and increase the area of contact between the head and both the point and metallic object, and thereafter applying increased pressure simultaneously with a welding current to further deform the head and increase the area of electrical contact between the head and point during the welding operation.

2. The method of electrically welding a headed aluminum stud to an aluminum object consisting in, first applying pressure by means of a welding point to the head of said stud in the absence of welding current to partially deform the same and increase the area of contact between the head and both the point and the aluminum object, and thereafter applying increased pressure simultaneously with a welding current to further deform the head and increase the area of electrical contact between the head and point during the welding operation.

3. The method of electrically welding a headed stud to a metallic object consisting in, first applying pressure by means of a welding point to the head of said stud in the absence of welding current to partially deform the same and provide an area of contact between said head and object substantially equal to the cross sectional area of the shank of said stud, and also increase the area of contact between said head and the welding point, and thereafter applying increased pressure simultaneously with welding current to further deform the head and increase the area of electrical contact between the head and welding point during the welding operation.

4. The method of electrically welding a stud having a shouldered head and a crowned outer face to a smooth surface of a metal object consisting in, first applying pressure by means of a welding point to the shoulder of said head in the absence of electric current to partially deform the head by flattening a portion of the crowned face in intimate contact with said object and reducing a portion of the shoulder to a conical taper, and thereafter applying additional pressure upon the head simultaneously with a welding current to further deform the head and increase the area of electrical contact between the head, welding point, and metal object.

5. The method of electrically welding a stud having a shouldered head and a crowned outer face to a smooth surface of a metal object consisting in, first applying pressure by means of a welding point to the shoulder of said head in the absence of electric current to partially deform the head by flattening a portion of the crowned face in contact with said object and reducing a portion of the shoulder to a conical taper, and thereafter applying additional pressure upon the head simultaneously with a welding current to further deform the head and provide a straight conical side in contact with said point and a flat outer face in contact with and partially fused to said metal object.

ROY S. PILGER.